United States Patent

Pongratz

(10) Patent No.: US 10,118,625 B2
(45) Date of Patent: Nov. 6, 2018

(54) ANTI-JERK METHOD

(71) Applicant: MAGNA STEYR Fahrzeugtechnik AG & Co KG, Graz (AT)

(72) Inventor: Christian Pongratz, St. Peter am Ottersbach (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 78 days.

(21) Appl. No.: 15/383,649

(22) Filed: Dec. 19, 2016

(65) Prior Publication Data

US 2017/0232972 A1   Aug. 17, 2017

(30) Foreign Application Priority Data

Jan. 4, 2016   (DE) .................. 10 2016 200 006

(51) Int. Cl.
*B60W 30/20* (2006.01)
*B60L 15/20* (2006.01)
(Continued)

(52) U.S. Cl.
CPC ......... *B60W 30/20* (2013.01); *B60L 15/2072* (2013.01); *B60L 15/2081* (2013.01);
(Continued)

(58) Field of Classification Search
CPC .. B60L 11/18; B60L 15/2072; B60L 15/2081; B60L 2240/423; B60L 2260/20; B60K 6/04; B60K 6/44; B60K 6/52; B60K 17/34; B60K 17/356; B60K 6/00; B60K 28/16; B60W 30/20; B60W 30/18027;
(Continued)

(56) References Cited

U.S. PATENT DOCUMENTS 5,994,859 A    11/1999 Deng et al.
2002/0087252 A1*   7/2002 Shimizu ................. B60K 6/44
                                                                701/84
(Continued)

FOREIGN PATENT DOCUMENTS

DE    10145891 A1    6/2003
DE    10313338 B4    4/2008
(Continued)

OTHER PUBLICATIONS

Office Action for Japanese Patent Application No. 2016-247373, dated Nov. 7, 2017, 7 pages including 3 pages of English translation.
Notice of Reasons for Rejection for Japanese Patent Application No. 2016-247373, dated Aug. 7, 2018, 7 pages including 3 pages of English translation.

*Primary Examiner* — Behrang Badii
(74) *Attorney, Agent, or Firm* — Jordan IP Law, LLC; Todd A. Vaughn

(57) ABSTRACT

A method for damping juddering in the drive train of a vehicle having an electric motor as the drive motor, and a vehicle having a closed-loop control system to carry out the method. The method includes calculating an electric motor setpoint torque for actuating the electric motor from an electric motor request torque which corresponds to a current request for a torque, and calculating a correction torque as a function of the electric motor request torque and a correction factor which is determined from a rotational speed of the electric motor.

15 Claims, 4 Drawing Sheets

(51) Int. Cl.
*B60W 30/18* (2012.01)
*B60W 30/188* (2012.01)
*B60W 30/192* (2012.01)
*B60K 17/34* (2006.01)
*B60K 6/52* (2007.10)
*B60L 11/18* (2006.01)
*B60K 17/356* (2006.01)
*B60K 6/44* (2007.10)

(52) U.S. Cl.
CPC .... *B60W 30/188* (2013.01); *B60W 30/18027* (2013.01); *B60W 30/192* (2013.01); *B60K 6/44* (2013.01); *B60K 6/52* (2013.01); *B60K 17/34* (2013.01); *B60K 17/356* (2013.01); *B60L 11/18* (2013.01); *B60L 2240/423* (2013.01); *B60L 2260/20* (2013.01); *B60W 2030/206* (2013.01); *B60W 2510/084* (2013.01); *B60W 2710/085* (2013.01); *B60Y 2200/91* (2013.01); *Y02T 10/645* (2013.01); *Y02T 10/72* (2013.01); *Y02T 10/7275* (2013.01)

(58) Field of Classification Search
CPC ............. B60W 30/188; B60W 30/192; B60W 2030/206; B60W 2510/084; B60W 2710/085; B60W 10/06; B60W 10/08; B60W 20/10; B60W 20/00; B60Y 2200/91; Y02T 10/645
See application file for complete search history.

(56) References Cited

U.S. PATENT DOCUMENTS

| | | | |
|---|---|---|---|
| 2002/0138183 A1* | 9/2002 | Keilhofer | B60L 11/18 701/22 |
| 2003/0177846 A1 | 9/2003 | Tamagawa et al. | |
| 2005/0065690 A1 | 3/2005 | Ashizawa et al. | |
| 2007/0138986 A1* | 6/2007 | Kutsuna | B60W 20/50 318/400.21 |
| 2009/0118967 A1* | 5/2009 | Kaiser | F02D 11/105 701/102 |
| 2012/0265400 A1* | 10/2012 | Oikawa | B60K 6/445 701/37 |
| 2013/0041541 A1* | 2/2013 | Kageyama | B60L 15/2036 701/22 |
| 2013/0041542 A1* | 2/2013 | Kageyama | B60L 15/2036 701/22 |
| 2013/0054073 A1* | 2/2013 | Kageyama | B60W 10/04 701/22 |
| 2013/0274976 A1* | 10/2013 | Suzuki | B60K 6/48 701/22 |
| 2016/0001769 A1* | 1/2016 | Kamioka | B60K 6/485 701/22 |
| 2016/0221468 A1* | 8/2016 | Suzuki | B60L 15/20 |

FOREIGN PATENT DOCUMENTS

| | | |
|---|---|---|
| DE | 202013104787 U1 | 11/2013 |
| JP | 2003248207 A | 9/2003 |
| JP | 2005102492 A | 4/2005 |
| WO | 2015105077 A | 7/2015 |

* cited by examiner

ANTI-JERK METHOD

CROSS-REFERENCE TO RELATED APPLICATIONS

The present application claims priority 35 U.S.C. §119 to German Patent Publication No. DE 10 2016 200 006.3 (filed on Jan. 4, 2016), which is hereby incorporated by reference in its entirety.

TECHNICAL FIELD

Embodiments relate to a method for damping juddering in the drive train of a vehicle having an electric motor as the drive motor, and a vehicle comprising a closed-loop control system configured to carry out such a method.

BACKGROUND

In all vehicles there is a specific oscillation behaviour of the drive train when starting, or also during driving if the drive train is excited suddenly. In vehicles having an electric motor as the drive motor, this oscillation is strongly pronounced, in particular, during starting. The reason for this is that the entire drive train can be understood in simplified terms as a spring-mass system, or as a rod spring which is inclined to oscillate as a result of corresponding excitation. In a vehicle having an electric motor drive, irregularities in the torque of the drive can arise, in particular, as a result of the mechanical design of the electric motor, of the rotational speed sensor and also a result of closed-loop control effects and activation effects in the inverter. This interference is dependent on the rotational speed and also on the load, meaning that a very broad interference spectrum can develop. As a result, at certain rotational speeds, natural frequencies can be excited by the downstream mechanical system, in particular the drive train, and resonance or resonances can occur. This oscillation of the drive train is particularly pronounced, in particular, in the lesser velocity range and when starting on an uphill gradient.

Conventional approaches to a solution for preventing said drive train oscillations or juddering are based on mechanical damping, in particular on oscillation damping by decoupling via a clutch. When an internal combustion engine is used, this oscillation can be counteracted by active adjustment of the ignition angle. A further approach to a solution which can be used in electric drives is based on strong limitation of the gradients during the build-up of torque and an associated lesser excitation of the spring system but also relatively poor dynamics of the vehicle.

German Patent Publication No. DE 10 2013 112 419 A1 discloses, for example, a method for anti-judder control of a hybrid vehicle without a torque converter, comprising: determining whether a gear shift command is output by a transmission control device of the hybrid vehicle; confirming a gear shift range which is divided into at least three phases and corresponds to the gear shift command if it is determined that the gear shift command is output; determining whether the corresponding divided gear shift range is an anti-judder-approval gear shift range; and phase reversal control of a drive motor of the hybrid vehicle by a predetermined value in order to reduce or damp a vibration and a shock which are generated in the corresponding gear shift range if it is determined that the corresponding gear shift range is the anti-judder-approval gear shift range.

German Patent Publication No. DE 10 2012 224 294 A1 discloses a method for anti-judder control of a vehicle which uses the power of a motor, wherein the method comprises the following: outputting an actual rotational speed of the motor via a controller; outputting a model rotational speed of the motor via the controller; outputting a vibration component on the basis of a difference between the output model rotational speed and the actual rotational speed of the motor via the controller; high-pass filtering of the vibration component via the controller in order to remove a fault component in the vibration component; delaying a phase of the filtered vibration component for a preset time via the controller in order to compensate the phase error occurring during the high-pass filtering; and applying the preset amplification to the filtered vibration component via the controller, during which amplification the phase is delayed for the preset time in order to generate an anti judder compensation torque.

U.S. Patent Publication No. US 2011 112 709 A1 discloses an anti-judder controller for a hybrid vehicle which comprises calculating a model speed of the motor, in a state in which a vibration of the drive train is not present, and calculating a difference between the model speed and a current speed.

The solution according to the invention for suppressing the mechanical oscillation of the drive train is intended to reduce or prevent the oscillation of the drive train without having to engage in the mechanical structure of the drive train. As a context, the acceleration of the vehicle is not to be markedly worsened either, and the subjective driving sensation, in particular the response behaviour to the accelerator pedal, is to be adversely influenced as little as possible for the driver.

SUMMARY

Embodiments relate to electronically damping occurring during oscillation or juddering which is experienced as disruptive, in particular, when starting a vehicle having an electric motor, and at the same time avoiding having an excessively adverse effect on the driving comfort of the vehicle, in particular, on the response behaviour of the vehicle to an accelerator pedal.

Embodiments relate to a vehicle that has has such electronic damping in response to juddering.

In accordance with embodiments, a method for damping juddering in the drive train of a vehicle having an electric motor as the drive motor, that includes at least one of: calculating an electric motor setpoint torque for actuating the electric motor from an electric motor request torque which corresponds to a current request for a torque, and calculating a correction torque as a function of the electric motor request torque, and calculating a correction factor formed from a rotational speed of the electric motor.

In accordance with embodiments, a new setpoint value is calculated for the torque of the electric drive motor, the electric motor setpoint torque, which is passed on to the electric motor or a closed-loop torque controller of the electric motor, on the basis of a previous setpoint value of the torque. The electric motor request torque, which is usually predefined by activation of an accelerator pedal by the driver and/or the ambient situation of the vehicle, for example, when the vehicle is started or is travelling uphill. In this context, the electric motor request torque usually still has no damping of juddering, while the electric motor setpoint torque has the judder-damping correction.

In accordance with embodiments, the electric motor setpoint torque is calculated from at least two components. Specifically, the electric motor setpoint torque is calculated from from the electric motor request torque, and a correction torque which is itself also dependent on the electric motor request torque. In addition, the correction torque is dependent on a correction factor which is determined from the current rotational speed of the electric motor.

Via such a correction of the electric motor request torque it is possible to compensate, in particular, the oscillations in the drive train which occur when the vehicle starts.

In accordance with embodiments, a vehicle comprises a drive train having an electric motor as a drive motor, and a closed-loop control system that includes a controller having logic, at least partially comprising hardware configured to, configured to: calculate an electric motor setpoint torque for actuating the electric motor from an electric motor request torque which corresponds to a current request for a torque, and calculate a correction torque as a function of the electric motor request torque, and calculating a correction factor formed from a rotational speed of the electric motor.

In accordance with embodiments, a method includes calculating an electric motor setpoint torque at least in a specific range of the vehicle velocity, as a sum of an electric motor request torque and of a correction torque. The correction torque is preferably formed as a product of a request correction torque, formed from the electric motor request torque, and the correction factor. In this context, the request correction torque may be calculated from the electric motor request torque via a characteristic diagram, in particular, via a value table.

In accordance with embodiments, the correction factor may be a positive value, or a negative value, or zero. The correction factor preferably can have only three discrete values, in particular, 0, −1 and +1.

In accordance with embodiments, the correction factor is determined via a three point closed-loop controller, from a rotational speed interference signal. The rotational speed interference signal itself is determined from the rotational speed of the electric motor.

In accordance with embodiments, the rotational speed interference signal is formed from the rotational speed of the electric motor via signal filtering, in particular, via a bandpass filter.

In accordance with embodiments, a method includes comparing the current vehicle velocity with a defined limiting velocity, and calculating the electric motor setpoint torque as a sum of the electric motor request torque and of the correction torque only if the current vehicle velocity is less in absolute value than the limiting velocity. If, on the other hand, the current vehicle velocity is greater in absolute value than the limiting velocity, the electric motor request torque is not corrected and the electric motor setpoint torque corresponds to the electric motor request torque.

In accordance with embodiments, the electric motor request torque corresponds to the current request for a torque, usually by a driver of the vehicle. The request may arise from a request via an accelerator pedal and/or may be predefined or changed by an upstream vehicle control system, such as still without anti-judder correction.

DRAWINGS

Embodiments will be illustrated by way of example in the drawings and explained in the description below.

DESCRIPTION

Figure 1:
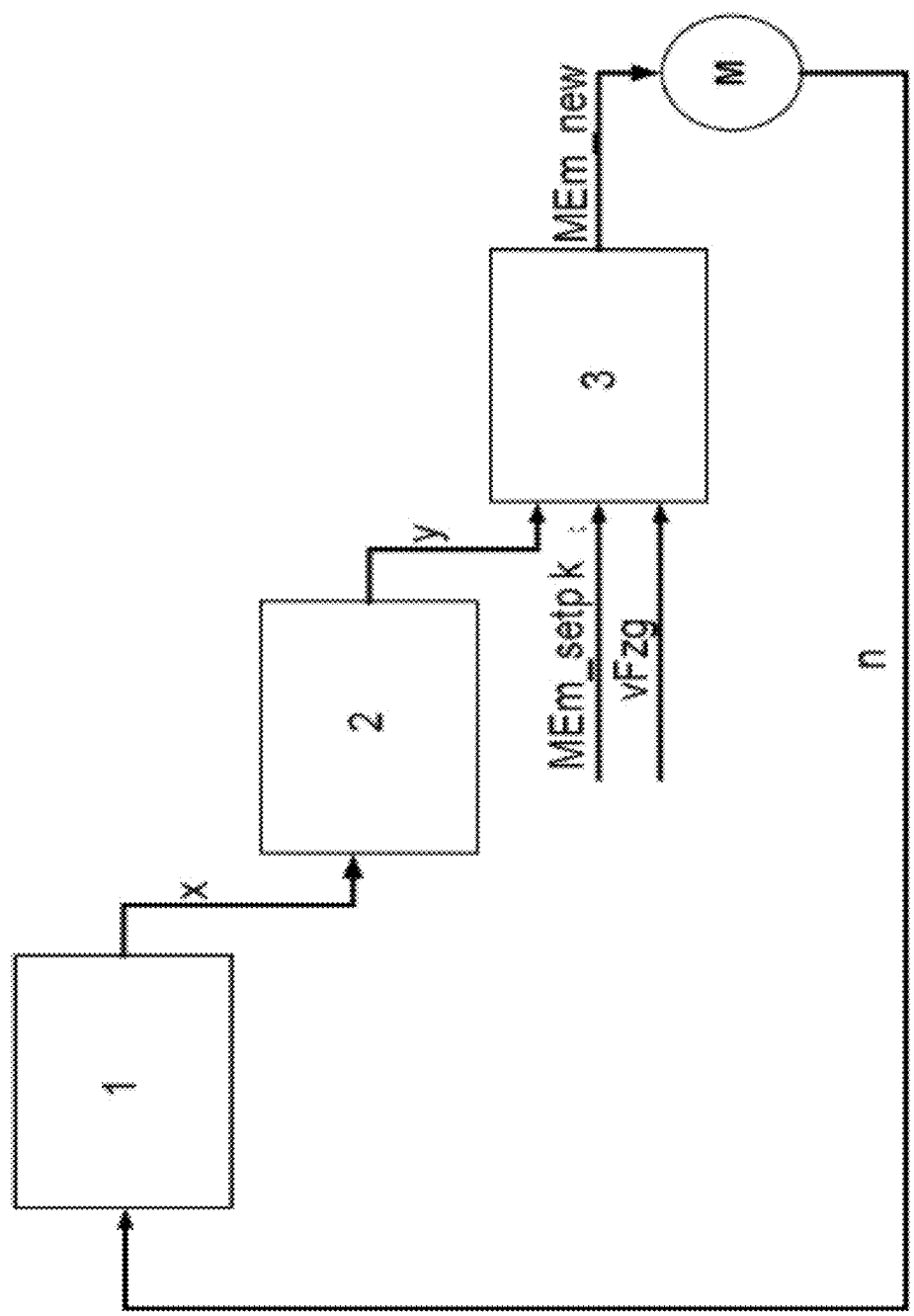
FIG. 1 illustrates a schematic illustration of a method for damping juddering in a drive train of a vehicle, in accordance with embodiments.

FIG. 1 illustrates by way of example the schematic design of an anti-judder method, in accordance with embodiments. The method is divided into three partial functions or modules, specifically signal filtering 1, signal analysis 2, and closed-loop control system 3.

Figure 2:
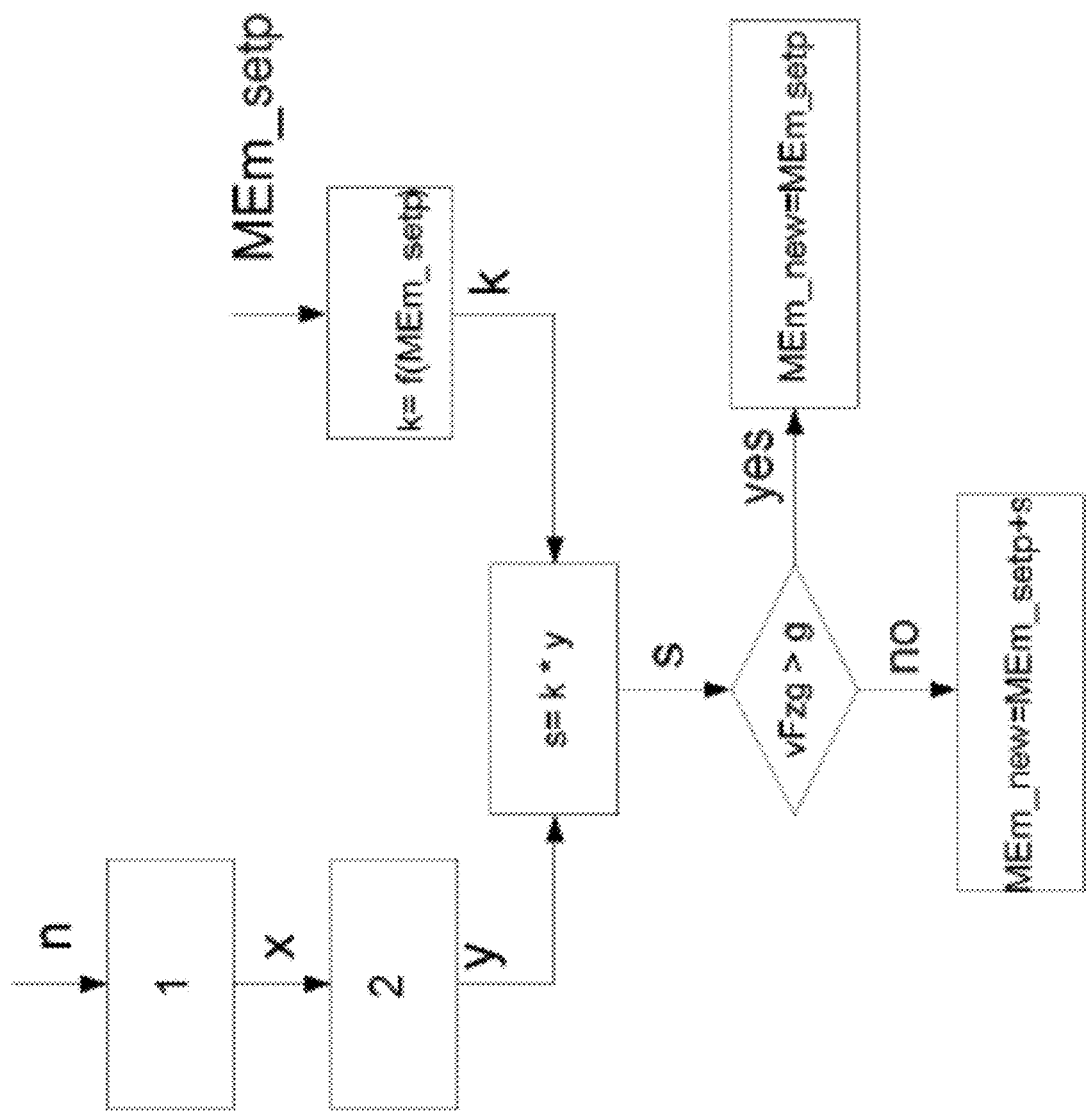
FIG. 2 illustrates a flow chart of a method for damping juddering in the drive train of a vehicle, in accordance with embodiments.
Figure 3:
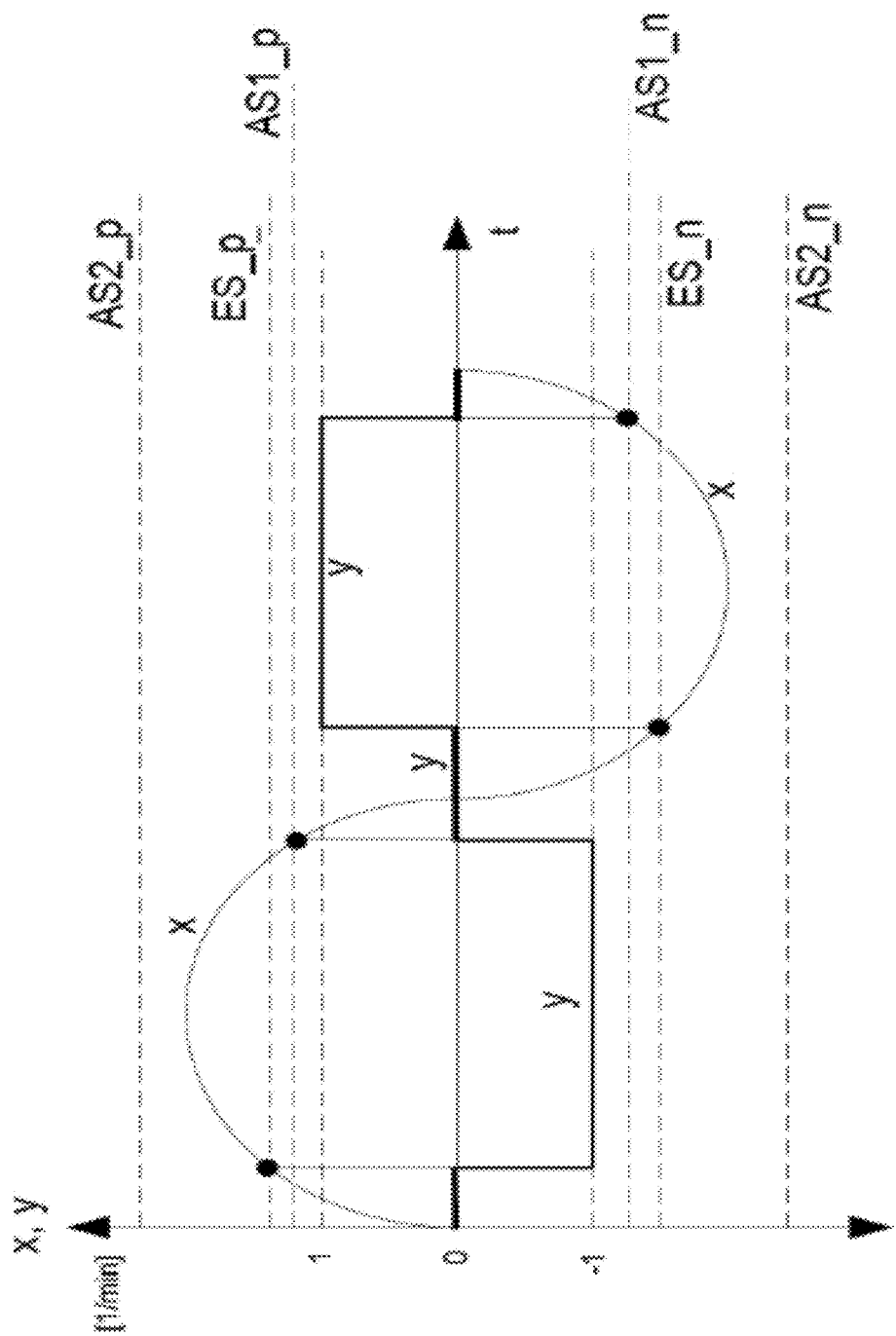
FIG. 3 illustrates a three point closed-loop controller for determining the correction factor y for carrying out the method, in accordance with embodiments.
Figure 4:
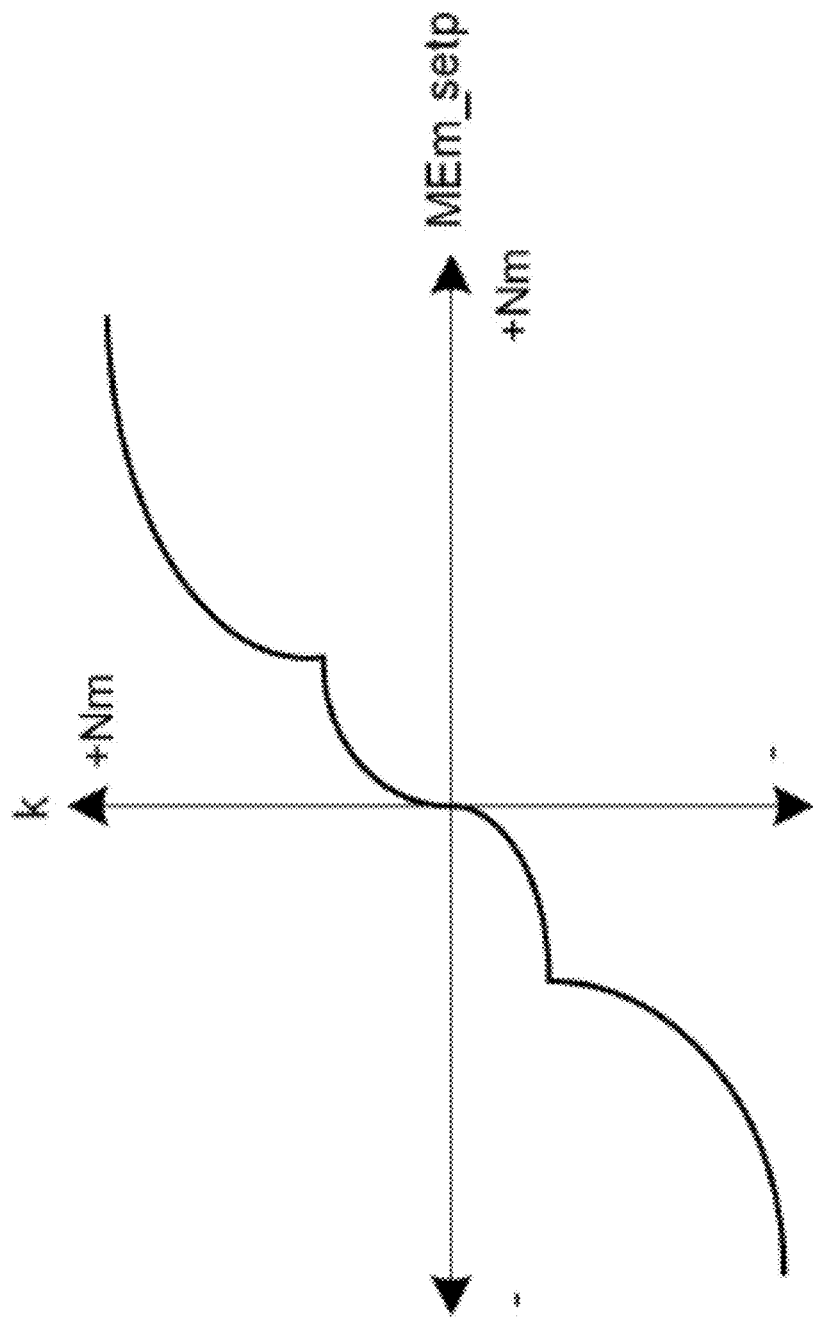
FIG. 4 illustrates a characteristic diagram for determining the request correction torque k, as a function of the electric motor request torque MEm_setp, in a method, in accordance with embodiments.

As illustrated in FIG. 2, a flow chart of the same method is illustrated in which all the components of the scheme, which components are not associated with the signal filtering 1 or with the signal analysis 2, are to be considered part of the closed-loop control system 3. Details of the method illustrated in FIGS. 1 and 2 are presented in more detail in FIGS. 3 and 4.

With respect to the signal filtering 1, the oscillation of the drive train is diagnosed via the rotational speed n of the electric motor and controlled as a function of this value. For this purpose, in accordance with the method, the control variable of the rotational speed n of the electric motor is read out from the electric drive motor M and processed via a filter system. In this context, the rotational speed n of the electric motor is firstly filtered via a bandpass filter. The configuration of the filter comprises narrowband filtering with a mid-frequency in the low frequency range, at approximately 5-50 Hz, for the purpose of releasing the rotational speed interference signal x. In this context, the bandpass filter is implemented, for example, by a series circuit of a parameterizable low pass filter and of a high pass filter. The cut-off frequencies are set in such a way that only the vehicle-specific oscillation can pass through the filter. This filtered rotational speed interference signal x is transferred to the signal analysis 2, in particular a signal analysis module.

With respect to the signal analysis 2, this module is implemented by a three point closed-loop controller (see in more detail in FIG. 3) with hysteresis. This approach is based on the fact that the illustrated drive train system is a nonlinear system, which can be modelled on the problem of a nonlinear control section. In this context, the rotational speed interference signal x is the input variable of the closed-loop controller. The output signal, specifically the correction factor y of the closed-loop controller, can assume three different states depending on the profile and amplitude of the rotational speed interference signal x (see FIG. 3). These are as follows.

a) Correction factor y=0 if the rotational speed interference signal x is located in the region of the zero cross and has not reached any of the parameterizable switch-on thresholds (switch-on threshold positive ES_p or switch-on threshold negative ES_n of the closed-loop controller).

b) Correction factor y=−1, if the rotational speed interference signal x has exceeded the parameterizable switch-on threshold positive ES_p and has not undershot the first switch-off threshold positive AS1_p (positive oscillation) and does not exceed the second switch-off threshold positive AS2_p. The two switch-off thresholds AS1_p, AS2_p are parameterizable. The first switch-off threshold positive AS1_p switches the closed-loop controller output, specifically correction factor y=0, as a function of the value of the amplitude if the rotational speed interference signal x becomes lesser than the parameter value AS1_p. The second switch-off threshold positive AS2_p resets the closed-loop controller output, specifically correction factor y to zero if the rotational speed interference signal x becomes greater than the associated parameter value AS2_p.

c) Correction factor y=1 if the negative rotational speed interference signal x is greater in absolute value than the switch-on threshold negative ES_n and does not undershoot the first switch-off threshold negative AS1_n in absolute value, and does not exceed the second switch-off threshold negative AS2_n in absolute value.

The two switch-off thresholds AS1_n, AS2_n are again parameterizable. The first switch-off threshold negative AS1_n switches the closed-loop controller output, correction factor y=0, as a function of the value of the amplitude if the negative rotational speed interference signal x becomes lesser in absolute value than the parameter value AS1_n. The second switch-off threshold negative AS2_n resets the closed-loop controller output, correction factor y, to 0 if the rotational speed interference signal x becomes greater in absolute value than the associated parameter value AS2_n.

The switch-off thresholds for the positive and negative interference signals AS1_p, AS2_p, AS1_n, AS2_n are introduced in order to permit more precise adjustment of the closed-loop control algorithm. The closed-loop controller output signal y is passed on to the downstream closed-loop control system module 3 (see FIG. 1).

With respect to the closed-loop control system 3: the closed-loop control system function engages in the closed-loop torque control system of the inverter of the electric motor. In order to permit this, the electric motor request torque MEm_setp, or the request correction torque k which is calculated therefrom and which has been derived from the accelerator pedal of the motor vehicle (driver's request) or has been calculated and/or predefined by other electronic control systems (engagement in driver's request) in the vehicle, is used as an input variable for this sub-module (control system 3)—see also FIG. 2 and FIG. 4.

The request correction torque k can be determined as a function of the current electric motor request torque MEm_setp from a table (look-up table) which is stored, for example, in the closed-loop control function or the closed-loop controller or in some other electronic control unit. See, for example, the characteristic diagram for the request correction torque k, as a function of the electric motor request torque MEm_setp, in FIG. 4.

Then, the request correction torque k is multiplied by the correction factor y from the signal analysis 2. The correction torque s=k*y (see FIG. 2). That is to say the request correction torque k is multiplied either by the correction factor y=1 or y=−1, or when y=0 there is no correction factor since then s=0.

Then, it is decided, as a function of the current vehicle velocity vFzg, whether the electric motor request torque MEm_setp has the correction torque s superimposed on it or added to it. Therefore, the vehicle velocity vFzg is required as a further input signal—said vehicle velocity vFzg serves to activate the entire anti-judder function in a specific velocity range. The activation takes place only if the vehicle velocity vFzg is lesser in absolute value than the parameterized limiting velocity g. Otherwise, the electric motor setpoint torque MEm_new is equal to the electric motor request torque MEm_setp; no correction torque s is added thereto.

The electric motor setpoint torque MEm_new which is determined in this way is then passed on to the electric motor M or the closed-loop torque control system of the electric motor M of the drive train.

Depending on the configuration of the drive train of a vehicle, drive train oscillations can occur, expressed in different ways, at load changes such as, for example, when starting. In accordance with embodiments, the method has the further advantage that it can be adapted to changing conditions and drive train configurations by simple parameterization.

The dependence of the method on the vehicle velocity and on the electric motor drive torque can be parameterized, for example, via the limiting velocity g and the characteristic diagram or the table for determining the request correction torque k. Therefore, adaptation to a wide variety of driving situations is also easily possible. For example, in the case of starting of the vehicle on an uphill gradient, a relatively large request correction torque k usually provides better results.

In accordance with embodiments, the method makes it possible to actively damp oscillations in a drive train, in particular juddering in the drive train.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second, etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

LIST OF REFERENCE SIGNS

M Electric motor
MEm_new Electric motor setpoint torque
MEm_setp Electric motor request torque
n Rotational speed of the electric motor
x Rotational speed interference signal
y Correction factor
s Correction torque
k Request correction torque
vFzg Vehicle velocity
g Limiting velocity
ES_p Switch-on threshold positive
ES_n Switch-on threshold negative
AS1_p First switch-off threshold positive
AS1_n First switch-off threshold negative
AS2_p Second switch-off threshold positive
AS2_n Second switch-off threshold negative

What is claimed is:

1. A method for damping juddering in a drive train of a vehicle having an electric motor as a drive motor, the method comprising:
   calculating an electric motor setpoint torque for actuating the electric motor from an electric motor request torque which corresponds to a current request for a torque; and
   calculating a correction torque as a function of the electric motor request torque and a correction factor which is determined from a rotational speed of the electric motor.

2. The method of claim 1, wherein the electric motor setpoint torque is calculated, at least in a specific range of a velocity of the vehicle, as a sum of the electric motor request torque and of the correction torque.

3. The method of claim 1, wherein the correction torque is calculated as a product of a request correction torque formed from the electric motor request torque, and the correction factor.

4. The method of claim 1, wherein the request correction torque is calculated from the electric motor request torque via a value table.

5. The method of claim 1, wherein the correction factor comprises at least one of a positive value, and a negative value.

6. The method of claim 1, wherein the correction factor comprises at least one 0, −1, and +1.

7. The method of claim 1, wherein the correction factor is calculated from a rotational speed interference signal formed from the rotational speed of the electric motor.

8. The method of claim 1, wherein the rotational speed interference signal is calculated from the rotational speed of the electric motor via a bandpass filter.

9. The method of claim 1, further comprising comparing a current vehicle velocity with a defined limiting velocity.

10. The method of claim 9, wherein the electric motor setpoint torque is calculated as a sum of the electric motor request torque and of the correction torque if the current vehicle velocity is less in absolute value than the limiting velocity.

11. The method of claim 9, wherein the electric motor setpoint torque is provided by the electric motor request torque if the current vehicle velocity is greater in absolute value than the limiting velocity.

12. The method of claim 1, wherein the electric motor request torque corresponds to a current request for a torque by a driver of the vehicle.

13. The method of claim 1, wherein the electric motor request torque corresponds to a request via an accelerator pedal.

14. The method of claim 1, wherein the electric motor request torque corresponds to a request via an upstream closed-loop vehicle control system.

15. A vehicle, comprising:
   a drive train having an electric motor as the drive motor; and
   a closed-loop control system including at least partially comprising hardware configured to, configured to:
   calculate an electric motor setpoint torque for actuating the electric motor from an electric motor request torque which corresponds to a current request for a torque; and
   calculate a correction torque as a function of the electric motor request torque and a correction factor which is determined from a rotational speed of the electric motor.

* * * * *